US008905182B2

(12) United States Patent
Masumoto et al.

(10) Patent No.: US 8,905,182 B2
(45) Date of Patent: Dec. 9, 2014

(54) WORK VEHICLE HAVING AN EXHAUST TREATMENT APPARATUS IN AN ENGINE ROOM

(71) Applicant: Kubota Corporation, Osaka-shi (JP)

(72) Inventors: Koji Masumoto, Sakai (JP); Katsumi Yanagihara, Sakai (JP); Makoto Kubota, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/786,556

(22) Filed: Mar. 6, 2013

(65) Prior Publication Data

US 2014/0020972 A1 Jan. 23, 2014

(30) Foreign Application Priority Data

Jul. 20, 2012 (JP) ................................ 2012-161672

(51) Int. Cl.
*B60K 13/04* (2006.01)
*B60K 5/00* (2006.01)
*B60K 11/06* (2006.01)
*F01N 13/18* (2010.01)

(52) U.S. Cl.
CPC . *B60K 11/06* (2013.01); *B60K 5/00* (2013.01); *B60K 13/04* (2013.01); *B60Y 2200/221* (2013.01); *F01N 13/1805* (2013.01)

USPC .......................................... 180/309; 180/68.1

(58) Field of Classification Search
CPC ................................ B60K 13/01; F01N 13/08
USPC ..................................... 180/309, 900; 903/905
See application file for complete search history.

(56) References Cited

U.S. PATENT DOCUMENTS

| 8,418,448 | B2 * | 4/2013 | Kamata et al. .................. 60/322 |
| 8,505,661 | B2 * | 8/2013 | Tsuji et al. .................... 180/68.4 |
| 2011/0167808 | A1 | 7/2011 | Kosaka et al. |
| 2012/0102932 | A1 | 5/2012 | Mitsuda |
| 2012/0124979 | A1 | 5/2012 | Noma |

FOREIGN PATENT DOCUMENTS

JP 2011-126488 A 6/2011

* cited by examiner

*Primary Examiner* — John Walters
*Assistant Examiner* — James Triggs
(74) *Attorney, Agent, or Firm* — The Webb Law Firm

(57) ABSTRACT

A board-like division member is provided that extends in a vehicle body transverse direction so as to divide a portion of the engine room into an upper region and a lower region along in an engine room height direction. An engine is mounted downwardly of the division member. An exhaust treatment apparatus is mounted upwardly of the division member for treating exhaust gas from the engine. An air discharge portion is formed in a lateral face region of the hood which corresponds to a position of the division member in the engine room height direction. Air present inside the engine room is discharged to the outside through this air discharge portion.

19 Claims, 8 Drawing Sheets

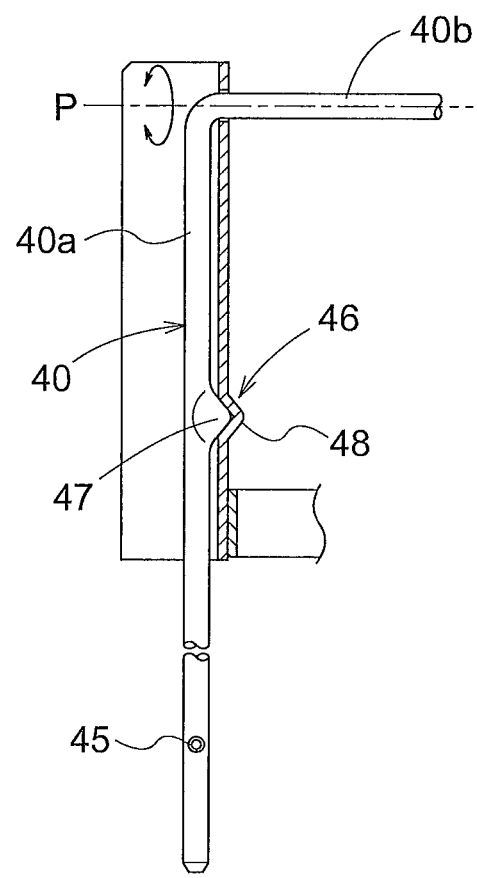

WORK VEHICLE HAVING AN EXHAUST TREATMENT APPARATUS IN AN ENGINE ROOM

BACKGROUND OF THE INVENTION

1. Field of the Invention

The present invention relates to a work vehicle having, in an engine room, an engine and an exhaust treatment apparatus for treating exhaust gas of the engine.

2. Description of the Related Art

The above-described work vehicle includes an engine hood which can be opened and closed between a closed state for covering the engine from above and an opened state for exposing the upper side of the engine to the outside. Inside the engine room, the engine and the exhaust treatment apparatus are arranged in a predetermined positional relationship relative to each other. For instance, in a work vehicle disclosed in Japanese Unexamined Patent Application Publication No. 2011-126488 (JP 2011-126488 A), an exhaust treatment apparatus is disposed upwardly of the engine. This exhaust treatment apparatus is an exhaust gas purifying apparatus (a DPF: diesel particulate filter) for purifying exhaust gas of the engine.

Such an exhaust gas purifying apparatus (DPF) effects a regeneration treatment in which a collected particulate matter is heated and combusted for its elimination by means of heating means such as a heater. Therefore, in case the exhaust gas purifying apparatus (DPF) is provided as an exhaust purifying apparatus inside an engine room, this exhaust purifying apparatus functions as a heat generating body, such that an amount of air present around the exhaust purifying apparatus is heated. Hence, if the air heated by the exhaust purifying apparatus stagnates inside the engine room, this may provide adverse effect by the heat to various components disposed in the vicinity of the engine.

For the reason described above, in case of the work vehicle disclosed in JP 2011-126488 A, a discharge opening is formed at an upper portion of the engine hood, so that air in the engine room may be discharged to the outside through this discharge opening, thereby to restrict occurrence of stagnation of air heated by the exhaust gas purifying apparatus inside the engine room. However, with provision of the discharge opening alone, the air in the engine room may not be positively guided to the discharge opening, due e.g. to generation of a turbulent flow inside the engine room, such that the air heated by the exhaust purifying apparatus may not be effectively discharged to the outside. Further, in this work vehicle, for positively guiding air inside the engine room to the discharge opening, there is provided a partition plate that extends from the rear side of the exhaust purifying apparatus toward the discharge opening. However, as this partition plate has a special shape, this presents a cost disadvantage.

The present invention has been made in view of the above-described state of the art. An object of the invention is to provide a simple discharging arrangement capable of discharging generated heat to the outside, from an exhaust purifying apparatus mounted inside an engine room.

SUMMARY OF THE INVENTION

The above-noted object is fulfilled according to an aspect of the present invention as under:—

A work vehicle comprising:
a hood for covering an engine room;
a cooling fan mounted in the engine room;
a board-like division member that extends in a vehicle body transverse direction so as to divide a portion of the engine room into an upper region and a lower region in an engine room height direction;
an engine mounted downwardly of the division member;
an exhaust treatment apparatus mounted upwardly of the division member for treating exhaust gas from the engine; and
an air discharge portion formed in a lateral face region of the hood which corresponds to a position of the division member in the engine room height direction, air inside the engine room being discharged to the outside through the air discharge portion.

With the above-described arrangement of the present invention, the division member is provided in the form of a board that extends in the vehicle body lateral width direction. Hence, air inside the engine room is divided into upper and lower air flow portions by this division member. At a same time, a part of the air portion flowing in the upper region flows along the upper face of the division member toward the air discharge portion. That is, the arrangement restricts the air heated by the exhaust purifying apparatus disposed upwardly of the division member against flowing into the lower region located downwardly of the division member. In this way, the air heated by the exhaust purifying apparatus will not stay in the upper region of the engine room, but will be discharged to the outside under the guiding function of the division member. Accordingly, the temperature-related adverse effect to the various components disposed in the lower region adjacent the engine is reduced. Further, since the division member has a simple shape like a flat board, no complicated work is needed for preparing the same. Hence, the arrangement presents a cost advantage also.

According to one preferred embodiment of the present invention, the exhaust purifying apparatus is attached to the division member. With this arrangement, the division member provides not only the function of guiding air inside the engine room in the vehicle body lateral width direction, but also the function of supporting the exhaust purifying apparatus. Hence, as the division member is provided with the two functions, the entire arrangement can be simplified. Moreover, since this division member is provided in the form of a board extending in the vehicle body lateral width direction, the exhaust purifying apparatus can be mounted under such a posture that the longitudinal direction of the exhaust purifying apparatus is aligned with the vehicle body lateral width direction. Therefore, the exhaust purifying apparatus can be mounted with effectively utilizing the space available inside the engine room in the vehicle body lateral width direction.

Preferably, the hood includes: a movable hood portion that can be opened/closed between a closed state for covering the engine room and an opened state for opening up the engine room; and a fixed hood portion that is fixed to the vehicle body, the air discharge portion being formed in the movable hood portion. According to an especially simple arrangement of the air discharge portion, the air discharge portion is an opening formed in the movable hood portion. With this arrangement in operation, the hot air heated by the exhaust purifying apparatus will come into contact mostly with the movable hood portion; whereas air having a lower temperature than the air contacting the movable hood portion will come into contact mainly with the fixed hood portion. Therefore, the fixed hood portion can be formed as a cover member made of relatively inexpensive resin. The cover body made of resin (i.e. fixed hood portion) extends in a fore/aft direction of the vehicle body so as to cover lower portions of respective lateral sides of the engine room, and the movable hood portion has right and left side wall portions that extend in the fore/aft direction of the vehicle body so as to cover upper portions of the lateral sides of the engine room.

According to one preferred embodiment of the present invention, the work vehicle further comprises: a partitioning wall member for dividing the engine room into a first sectioned chamber and a second sectioned chamber in a vehicle body fore/aft direction; the first sectioned chamber accommodating the cooling fan, the engine and the exhaust purifying device; and the air discharge portion discharging air inside the first sectioned chamber to the outside.

Preferably, in the above-described arrangement, the first sectioned chamber is disposed forwardly of the second sectioned chamber relative to the vehicle body fore/aft direction. With this arrangement, with provision of the partitioning wall member, it becomes possible to restrict the air heated by the exhaust purifying apparatus against flowing to the rear side of the engine room. And, since the partitioning wall member is disposed rearwardly of the opening in the vehicle body fore/aft direction, it is possible to restrict the air heated by the exhaust purifying apparatus against flowing toward the rear side, and also to positively guide this air heated by the exhaust purifying apparatus toward the opening. With this, air heated by the exhaust purifying apparatus can be positively guided to the opening to be discharged therethrough to the outside, thereby to appropriately restrict occurrence of such inconvenience of the air by giving its temperature-related adverse effect to the various components mounted in the vicinity of the engine.

According to one preferred embodiment of the present invention, a position of a lower edge of the opening in the vehicle body fore/aft direction is in substantial agreement with a position of the division member relative to the engine room height direction; and a length of the opening relative to the vehicle body fore/aft direction is greater than a length of the division member relative to the vehicle body fore/aft direction.

With the above arrangement, flowing of the air heated by the exhaust purifying apparatus to the side lower than the division member is restricted. Hence, with setting the lower end of the opening at substantially same position as the division member in the vertical direction, and thus with arranging the opening upwardly of the division member, it becomes easy to discharge the air guided by the division member directly to the outside. Moreover, since the opening has a greater width in the vehicle body fore/aft direction than the division member, it becomes easy to discharge the air guided by the division member in the vehicle body fore/aft direction also.

According to one preferred embodiment of the present invention, the work vehicle further comprises a second air discharge portion formed in the lateral face region of the hood downwardly of the air discharge portion for discharging the air present in the lower region to the outside.

With this arrangement, a portion of the air flowing through the upper region in which the exhaust purifying device is located and another portion of the air flowing through the lower region in which no high-temperature generating components exist are discharged in the form of upper and lower separated flows to the outside, respectively. With this, it is possible to restrict the adverse effect of heat against being given to the components disposed in the lower region.

Another aspects of the invention, as well as advantages and effects resulting therefrom, will be apparent by reading a preferred embodiment of the work vehicle to be described hereinafter with reference to the accompanying drawings.

BRIEF DESCRIPTION OF THE DRAWINGS

FIG. 8 is a view showing principal portions of the position maintaining mechanism.

DETAILED DESCRIPTION OF THE PREFERRED EMBODIMENTS

Figure 1:
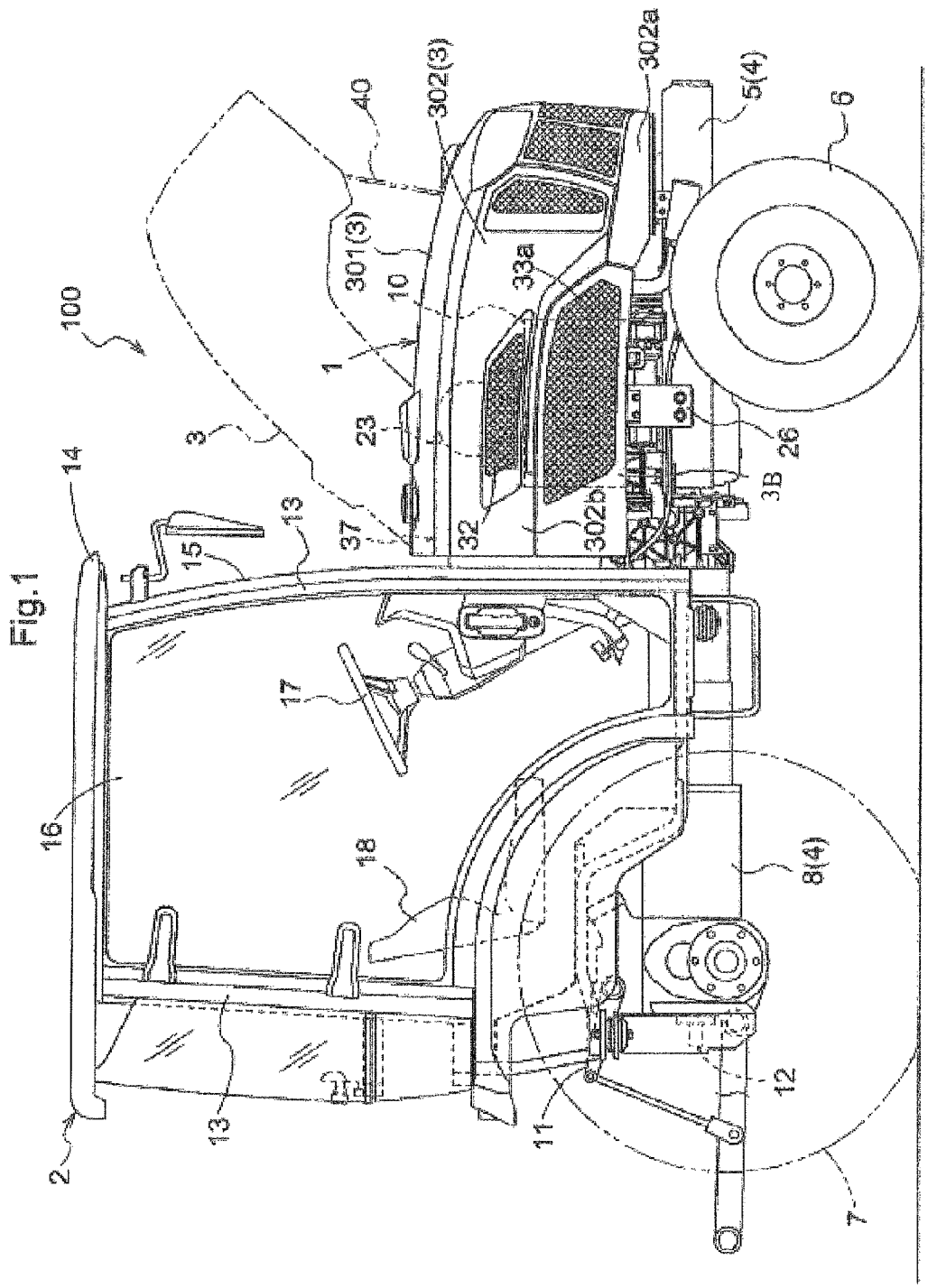
FIG. 1 is an overall side view of a tractor.
Figure 2:
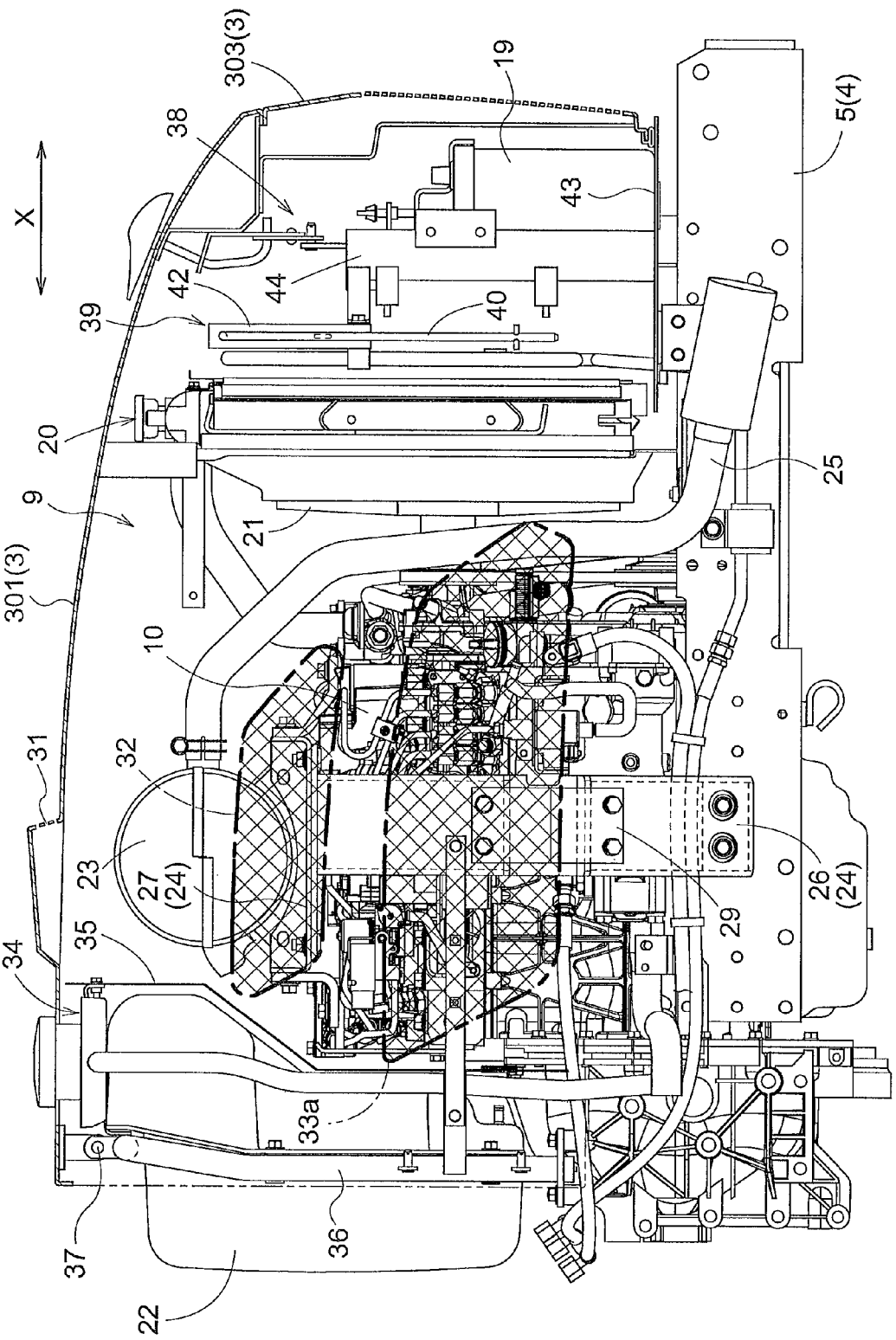
FIG. 2 is a side view showing the inside of an engine room.
Figure 3:
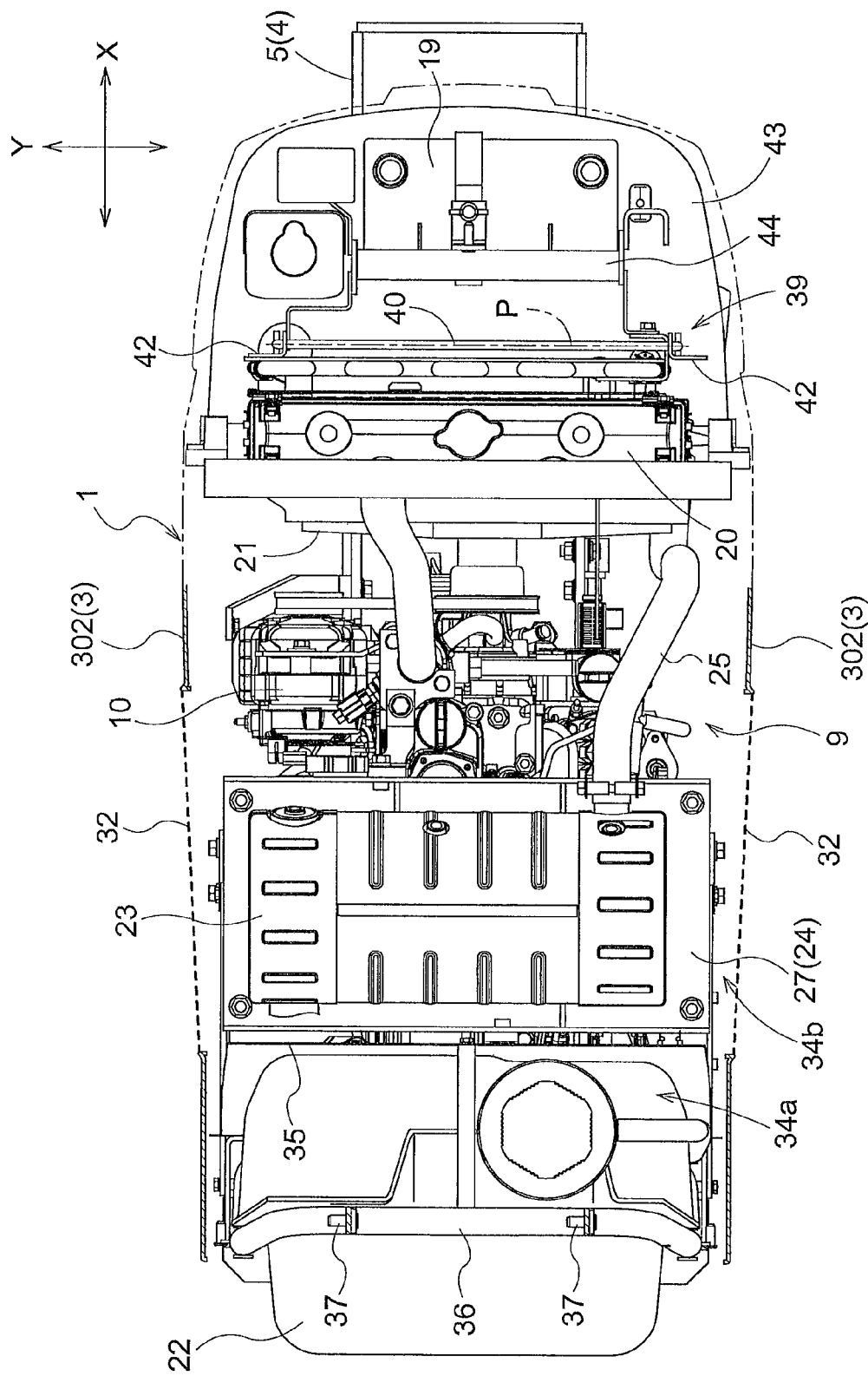
FIG. 3 is a plan view showing the inside of the engine room.
Figure 4:
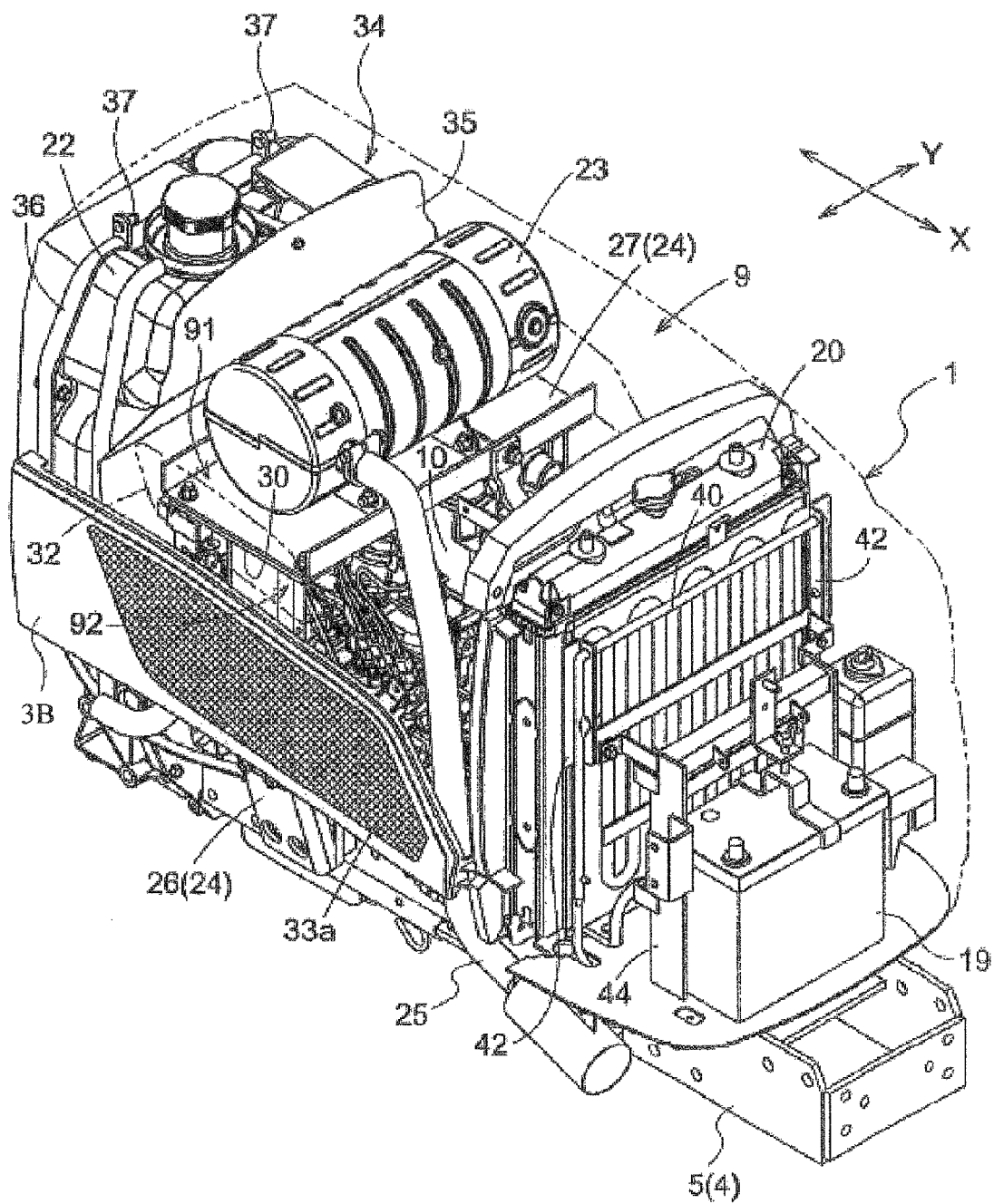
FIG. 4 is a perspective view showing the inside of the engine room.
Figure 5:
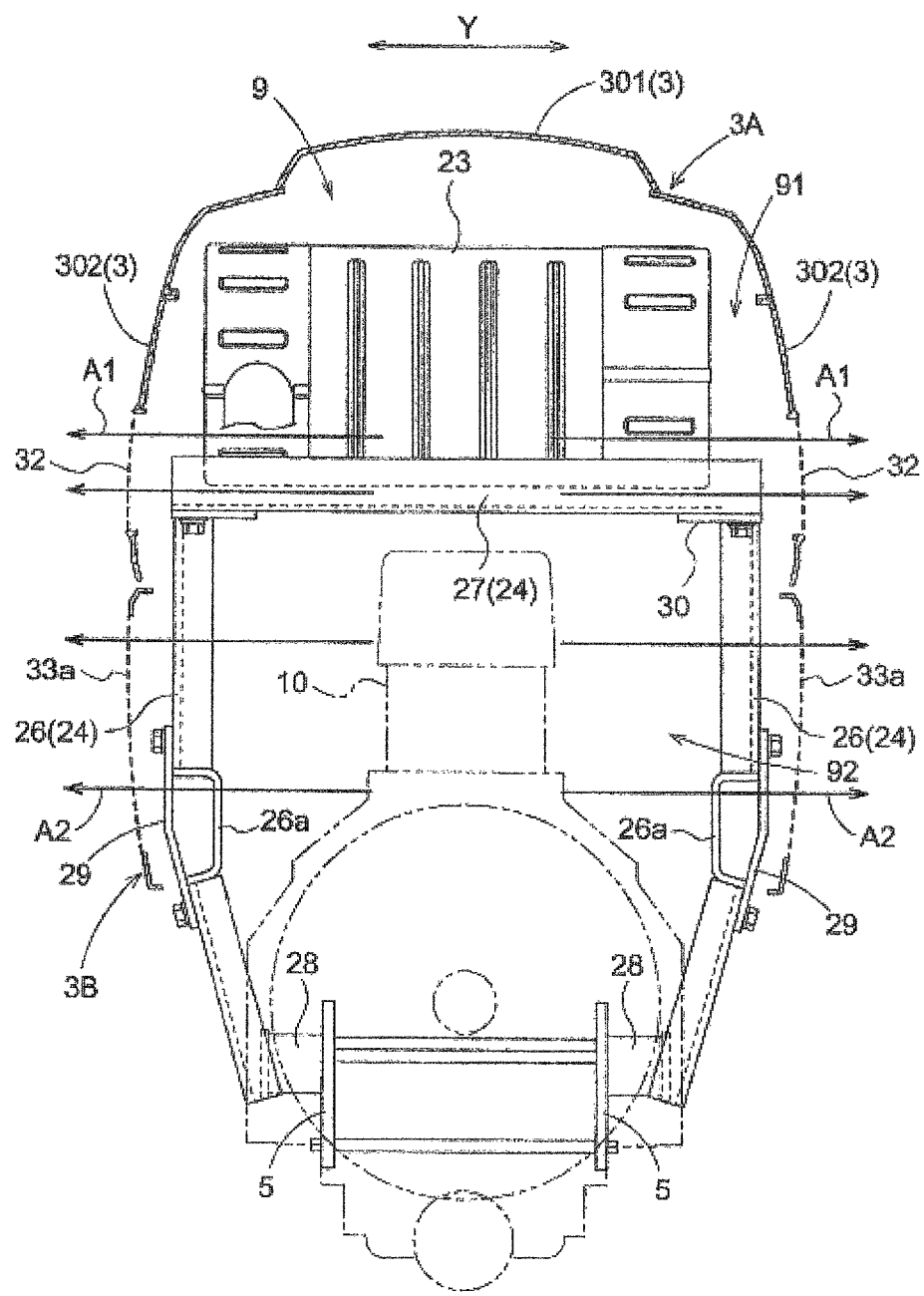
FIG. 5 is a section view showing the inside of the engine room as seen in a vehicle body fore/aft direction.

FIG. 1 shows an overall side view of a tractor with a cabin as an example of a work vehicle relating to the present invention. FIG. 2 is a side view showing the inside of an engine room. FIG. 3 is a plan view showing the inside of the engine room. FIG. 4 is a perspective view showing the inside of the engine room. FIG. 5 is a section view showing the inside of the engine room as seen in a vehicle body fore/aft direction.

This tractor 100, as shown in FIG. 1, includes an engine section 1 disposed at a front position of the vehicle body and a driver's cabin 2 disposed at a rear position of the vehicle body. The tractor 100 further includes a traveling vehicle body 4 supported by a pair of right and left front wheels 6 and a pair of right and left rear wheels 7. The traveling vehicle body 4 comprises an integrally connected assembly of an engine mount frame 5, a clutch housing (not shown), and a transmission case 8.

Rearwardly of the transmission case 8, there are provided a pair of right and left lift arms 11, a power takeoff (PTO) shaft 12 for enabling takeoff of engine power to the outside, etc. To the PTO shaft 12, power from the engine 10 is transmitted via an implement transmission line provided separately of a traveling transmission line and comprised of a speed changer (not shown), an implement clutch (not shown), etc. And, to the right and left lift arms 11, there is connected a link mechanism (not shown) pivotally attached to the rear portion of the transmission case 8 to be lifted up/down. And, to the PTO shaft 12, there are connected such components as a transmission shaft for transmitting power to a utility implement (not shown) such as a rotary cultivator connected to the link mechanism.

The driver's cabin 2 includes a cabin frame 13 mounted erect at the front, rear, right and left corners, a roof member 14 supported by the cabin frame 13, a front shield glass 15 formed of e.g. a transparent curved glass sheet, and a pair of right and left door panels 16 of outwardly opening type provided on the right and left sides of the cabin and formed of transparent glass sheets. The driver's cabin 2 as a whole presents a rectangular box-like shape and inside thereof, there are provided such components as a steering wheel 17, a driver's seat 18, etc.

The tractor 100 further includes a hood 3 consisting of: a movable hood portion 3A that can be opened/closed between a closed state (indicated by solid lines in FIG. 1) and an opened state (indicated by a two-dot-and-a-dash line in FIG. 1); and a fixed hood portion 3B. As shown in FIGS. 2-4, the hood 3 with its movable hood portion 3A set to the closed state creates therein an engine room 9 which surrounds the front side, the opposed lateral sides and the upper side of the engine section 1 and accommodates the engine 10 therein.

Next, with reference to FIGS. 2 through 5, the engine section 1 will be described. In FIGS. 2-5, the fore/aft direction of the vehicle body is shown as the X direction, and the lateral width direction of the vehicle body is shown as the Y direction.

With reference to the engine section 1, inside the engine room 9, there is mounted the engine 10 comprising a diesel engine mounted on the engine mount frame 5 via vibration isolating members or the like supported in a vibration isolated manner. Power from this engine 10 is transmitted via the traveling speed changer (not shown) housed in the transmission case 8 acting also as a frame to the front wheels 6 and the rear wheels 7. Therefore, this tractor is capable of four-wheel drive traveling.

As some of the components of the engine section 1 disposed inside the engine room 9, as shown in FIGS. 2-4, in the order from the front side in the machine body fore/aft direction (X direction), there can be cited a battery 19, an engine cooling radiator 20, a cooling fan 21 and the engine 10. As further components of the engine section 1, there are provided an engine air cleaner (not show), and an exhaust treatment apparatus 23 accommodating a DOC (diesel oxidizing catalyst), a DPF (diesel particulate filter), etc. Rearwardly of the engine room 9, a fuel tank 22 is disposed.

The exhaust treatment apparatus 23 is mounted on a portal-shaped exhaust treatment apparatus support 24 extending upwardly from the engine mount frame 5 and disposed upwardly of the engine 10. The exhaust treatment apparatus 23 is configured such that fine particulate matter contained in exhaust gas from the engine 10 is collected by the DPF and un-combusted fuel contained in the exhaust gas is oxidized and combusted by the DOC, whereby the temperature of the exhaust gas is raised to burn the fine particulate matter collected by the DPF, thus regenerating this DPF. The exhaust gas from the engine 10 is treated by the exhaust treatment apparatus 23 and then mixed with ambient air and cooled. And, this cooled exhaust gas is eventually discharged to the outside.

Figure 6:
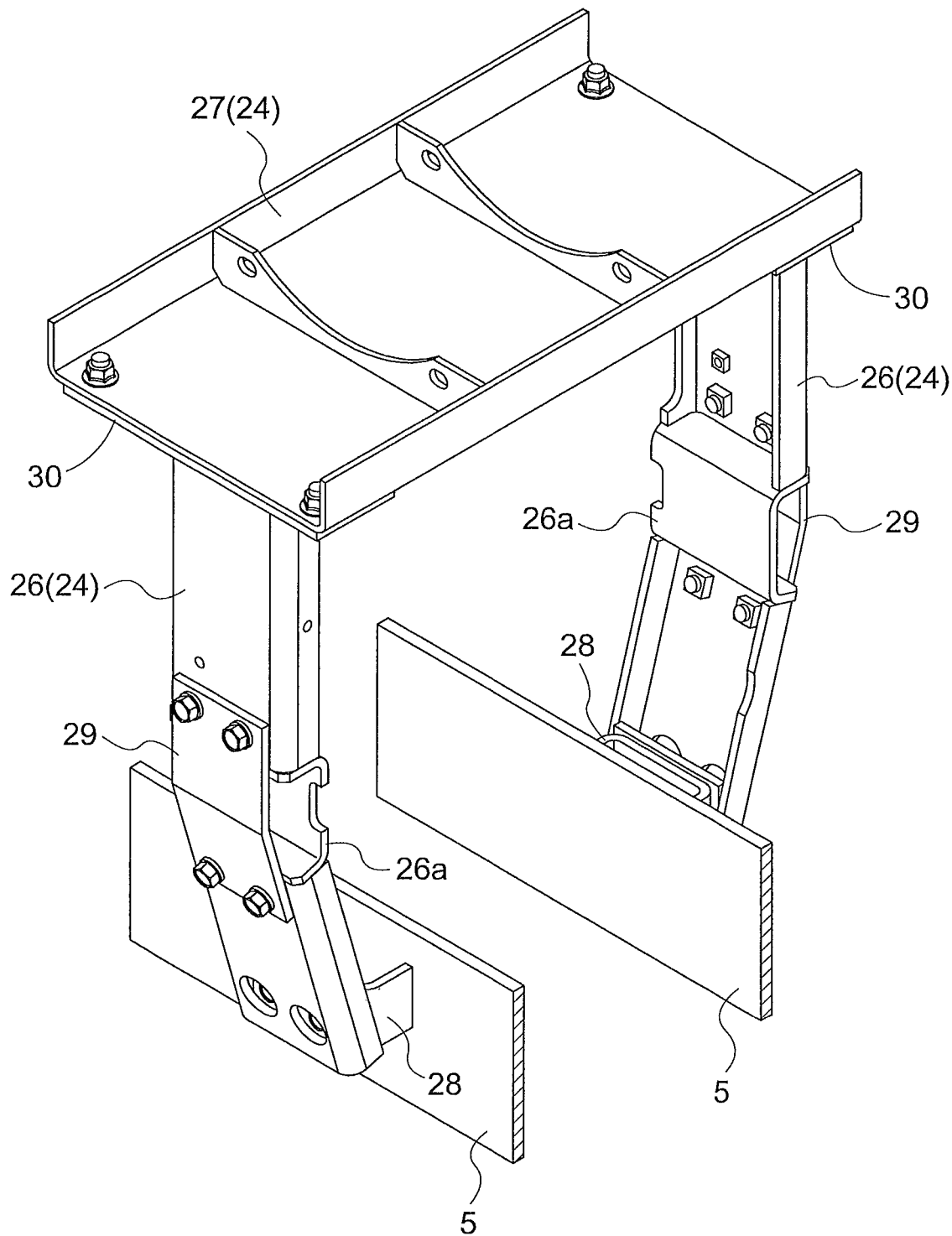
FIG. 6 is a perspective view showing a support for an exhaust purifying apparatus.

As shown in FIG. 5 and FIG. 6, the exhaust treatment apparatus support 24 is comprised of a pair of right and left extension members 26 extending upwardly from the engine mount frame 5 and a board-like division member 27 that interconnects the upper ends of the pair of right and left extension members 26 with each other. That is, in the instant embodiment, the division member 27 is designed as a horizontal bridge plate for the exhaust treatment apparatus support 24. FIG. 6 is a perspective view showing the exhaust treatment apparatus support 24.

Each of the pair of right and left extension members 26 has its lower end connected to a connecting portion 28 extending outward from the engine mount frame 5 and has a bent shape bent at a vertically intermediate portion 26a thereof. Further, each of the pair of right and left extension members 26, as shown in FIG. 5, is disposed under such a posture that the extension member 26 extends outwards in the vehicle body lateral width direction (Y direction) from its lower end portion to the intermediate portion 26a and extends vertically from this intermediate portion 26a to its upper end. At the intermediate portion 26a of each of the pair of right and left extension members 26, a reinforcement member 29 is attached to its outer side, and this reinforcement member 29 has a bent shape corresponding to the shape of the intermediate portion 26a of the extension member 26. In this way, the exhaust treatment apparatus support 24 is configured to ensure a sufficient disposing space for the exhaust treatment apparatus 23 in the vehicle body lateral width direction by rendering the distance between the upper ends of the pair of right and left extension members 26 greater than the distance between the lower ends of the same.

The division member 27 is provided in the form of a board extending in the vehicle body lateral width direction (Y direction), with opposed ends thereof in the vehicle body lateral width direction being supported by the respective upper ends of the pair of right and left extension members 26. In the instant embodiment, the division member 27 is comprised of a single board-like member having an unvarying width in the vehicle fore/aft direction. Instead of this, various other arrangements thereof will be possible such as one wherein the widths of the division member 27 in the vehicle fore/aft direction differ between the right side and the left side in the vehicle body lateral width direction. Further, it is also possible to form at least one vertically extending hole or the like at a portion or portions of the division member 27 to extend therethrough, in order to avoid interference with other component(s).

Each of the pair of right and left extension members 26 includes, at an upper end thereof, a board-like mount 30, so that the division member 27 may be positioned on top of these pair of right and left mounts 30. Then, the exhaust treatment apparatus 23 is supported and mounted on the division member 27 under a posture with its longitudinal direction being aligned with the vehicle body lateral width direction. The division member 27 is designed such that its length in the vehicle body lateral width direction is longer than a length of the exhaust treatment apparatus 23, and that the opposed ends of the division member 27 in the vehicle body lateral width direction extend to positions adjacent right and left wall portions 302 of the opposed right and left sides of the movable hood portion 3A. In this way, the division member 27 is provided to extend over the whole length inside the engine room 9 in the vehicle body lateral width direction.

The movable hood portion 3A, as shown in FIG. 2, FIG. 3 and FIG. 5, is configured like a box-like component with its lower side and rear side being opened, having an upper panel 301, right and left lateral wall portions 302 (corresponding to the lateral portions of the movable hood portion 3A) on the right and left opposed sides in the vehicle body lateral width direction (Y direction), and a front panel 303. The upper panel 301, the right and left lateral wall portions 302 on the right and left opposed sides and the front panel 303 together form an integral panel body and this panel body constitutes the movable hood portion 3A.

The upper panel 301 is formed elongate in the vehicle body fore/aft direction so as to cover the upper side of the engine section 1. The upper panel 301 includes, at a portion thereof corresponding to the upper side of the exhaust treatment apparatus 23, an upper discharge portion 31 capable of discharging air inside the engine room 9 to the outside. Each of the right and left lateral wall portions 302 extends downwards from the lateral side of the upper panel 301 in the vehicle body lateral width direction, so that the right and left lateral wall portions 302 on the right and left opposed sides together cover the opposed lateral sides of the engine section 1. The front panel 303 extends downwards from the front end of the upper panel 301 to cover the front side of the engine section 1.

In each of the right and left lateral wall portions 302, as shown in FIG. 1, under its closed state (denoted with the solid lines in the illustration), a front portion 302a in the vehicle body fore/aft direction extends from the upper panel 301 to the vicinity of the engine mount frame 5, and a rear portion 302b in the vehicle body fore/aft direction extends from the upper panel 301 to an intermediate position between the upper panel 301 and the engine mount frame 5. In this way, each of the right and left lateral wall portions 302 is formed such that its rear portion 302b is recessed upwards relative to its front portion 302a. Each of the right and left lateral wall portions 302 includes an opening 32 which functions as an air discharge portion for discharging air inside the engine room 9 to the outside.

This opening 32 is comprised of a group of pores defined in the rear portion 302b of the left/right lateral wall portion 302. The positional relationship between the opening 32 and the division member 27 supporting the exhaust treatment apparatus 23 is illustrated in FIG. 1, FIG. 2, FIG. 3 and FIG. 5. Namely, the opening 32 is in opposition to the end of the division member 27 in the vehicle body lateral width direction. In FIG. 2, the opening 32 is shown as an area surrounded by slanting lines. The opening 32 is disposed to be located at a substantially same position as the division member 27 in the vehicle body fore/aft direction and the width of the opening 32 in the vehicle body fore/aft direction is greater than that of the division member 27. Further, in the vertical direction, the lower end of the opening 32 is disposed to be located at a substantially same position as the division member 27.

As members for covering the opposed lateral sides of the engine section 1, the fixed hood portion 3B is provided in addition to the right and left lateral wall portions 302 on the right and left opposed sides. This fixed hood portion 3B, as shown in FIG. 1, FIG. 4 and FIG. 5, is configured to cover the opposed lateral sides of the engine section 1 as overlapping the lower sides of the right and left lateral wall portions 302 at the lower sides of the respective right and left lateral wall portions 302 of the movable hood portion 3A under its closed state. The fixed hood portion 3B is provided separately from the movable hood portion 3A and fixedly supported by the engine mount frame 5. The movable hood portion 3A can be rendered into the closed state, as being separated from the fixed hood portion 3B. And, the fixed hood portion 3B is fixed at a position overlapped with the lower portions of the right and left lateral wall portions 302 of the movable hood portion 3A under the closed state of the same.

The fixed hood portion 3B is disposed downwardly of the rear portions 302b of the right and left lateral wall portions 302 so as to be located downwardly of the openings 32 of the right and left lateral wall portions 302. And, the fixed hood portion 3B is provided as a porous member formed of resin and configured to cover the opposed lateral sides of the portion mounting electric components of the engine section 1. In most of the fixed hood portion 3B except for the rear end portion thereof, a group of pores 33a are formed. The group of pores 33a function as an air discharge portion for the fixed hood portion 3B (a second air discharge portion) and is disposed downwardly of the opening 32 of the left/right lateral wall portion 302.

Inside the engine room 9, not only the engine 10 but also other devices or instruments such as the exhaust treatment apparatus 23 are accommodated. And as shown in FIGS. 2-4, there is provided a partitioning wall member 35 for dividing the space surrounded by the hood 3 into a first sectioned chamber 34a and a second sectioned chamber 34b in the vehicle body fore/aft direction. The first sectioned chamber 34a accommodates the fuel tank 22. The second sectioned chamber 34b accommodates not only the engine 10, but also other components such as the exhaust treatment apparatus 23, etc. The fuel tank 22 is supported by a portal-shaped fuel tank support 36 extending upward from the engine mount frame 5. And, the fuel tank support 36 is formed like a bar and configured to support not only the fuel tank 22, but also the partitioning wall member 35. The partitioning wall member 35 is disposed rearwardly of the engine 10 in the vehicle body fore/aft direction. And, this partitioning wall member 35 is provided in the form of a board which extends vertically and is bent at an intermediate portion thereof such that the upper portion of this board protrudes more forwardly than its lower portion. The partitioning wall portion 35 is configured such that, when the movable hood portion 3A is rendered to the closed state, the opposed ends thereof in the vehicle lateral width direction are brought into the vicinities of the inner sides of the right and left lateral wall portions 302 of the movable hood portion 3A and the upper end thereof is brought into the vicinity of the inner side of the upper panel 301, thus the closed movable hood portion 3A closing the first sectioned chamber 34a and the second sectioned chamber 34b from above.

As described above, with the provision of the division member 27 supporting the exhaust treatment apparatus 23, the openings 32 of the right and left lateral wall portions 302 and the partitioning wall member 35, air heated by the exhaust treatment apparatus 23 and present inside the engine room 9 can be discharged to the outside, thus preventing heat-related adverse effect from being applied to the various instruments or the like disposed near the engine 10. This will be described in greater details next.

As may be understood from FIG. 4 and FIG. 5, the engine room 9 is divided by the division member 27 into an upper region 91 where the exhaust treatment apparatus 23 is disposed and a lower region 92 where the engine 10 is disposed. Therefore, the flow of air generated by the cooling fan 21 is divided by the division member 27 into an upper flow portion which flows into the upper region 91 where the exhaust treatment apparatus 23 is disposed and a lower flow portion which flows into the lower region 92 where the engine 10 is disposed. The upper flow portion which flows toward the exhaust treatment apparatus 23 will hit this exhaust treatment apparatus 23 and then be guided along the upper face of the division member 27 as a flow along the vehicle body lateral width direction (Y direction) A1, to be then discharged through the opening 32 to the outside. The lower flow portion which flows into lower region 92 where the engine 10 is disposed will flow beside the engine 10. And, when passing the sides of the engine 10, a portion of the lower flow portion will be discharged as a flow along the vehicle body lateral width direction (Y direction) A2 and then discharged through the opening 33a of the fixed hood portion 3B to the outside. In this way, as the air inside the engine room 9 is discharged to the outside through the upper opening 32 and the lower opening 33a, there are created upper and lower air discharge lines. This prevents the surrounding of the exhaust treatment apparatus 23 from becoming too hot and restricts the adverse effect of the heat from being transferred to the instruments disposed around the lower side of the exhaust treatment apparatus 23. Further, as shown in FIG. 3, with respect to the vehicle body fore/aft direction (X direction), as the partitioning wall member 35 is provided, the air heated by the exhaust treatment apparatus 23 and present inside the engine room 9 is restricted by the partitioning wall member 35 against flowing rearwardly of the partitioning wall member 35. And, as the partitioning wall member 35 is disposed rearwardly of the opening 32, the air heated by the exhaust treatment apparatus 23 and present inside the engine room 9 can be guided positively toward the opening 32. In this manner, the air heated by the exhaust treatment apparatus 23 and present inside the engine room 9 is guided under the guiding functions of the division member 27 and the partitioning wall member 35 toward the opening 32 to be discharged to the outside, thus preventing adverse heat effect from being applied to the various instruments disposed in the vicinity of the engine 10.

Inside the engine room 9, the electric components of the engine section 1 are disposed downwardly of the division member 27; and downwardly of the right and left lateral wall portions 302, there is provided the fixed hood portion 3B made of resin for covering the portion where the electric components or the like of the engine section 1 are disposed. Then, as described above, under the guiding function of the division member 27, the air heated by the exhaust treatment apparatus 23 and present inside the engine room 9 is restricted against flowing downwardly of the division member 27, to be thereby discharged to the outside via the opening 32. This restricts direct reaching of the hot air generated by the exhaust treatment apparatus 23 to the electric components or the fixed hood portion 3B.

Next, opening and closing operations of the movable hood portion 3A will be described.

The movable hood portion 3A, as shown in FIG. 2, is provided with a pivot shaft portion 37 mounted on the inner side of the rear end of the upper panel 301 in the vehicle body fore/aft direction (X direction); and this pivot shaft portion 37 is pivotally connected to the fuel tank support 36. With this, the movable hood portion 3A is vertically pivotable about the pivot shaft portion 37 as the pivot axis.

As shown in FIG. 2, a look mechanism 38 is provided for locking the movable hood portion 3A to the closed state after this movable hook portion 3A is downwardly pivoted to the closed state. The lock mechanism 38 is provided on the front side in the vehicle body fore/aft direction (X direction). Though not shown or described in details, the lock mechanism 38 includes an operational portion switchable between a locked state and a releasing state for releasing the locked state, and a lock coupling mechanism operable in response to an operation of the operational portion and switchable between a state for establishing engagement between an engaged portion and an engaging portion and a state for releasing this engagement.

Figure 7:
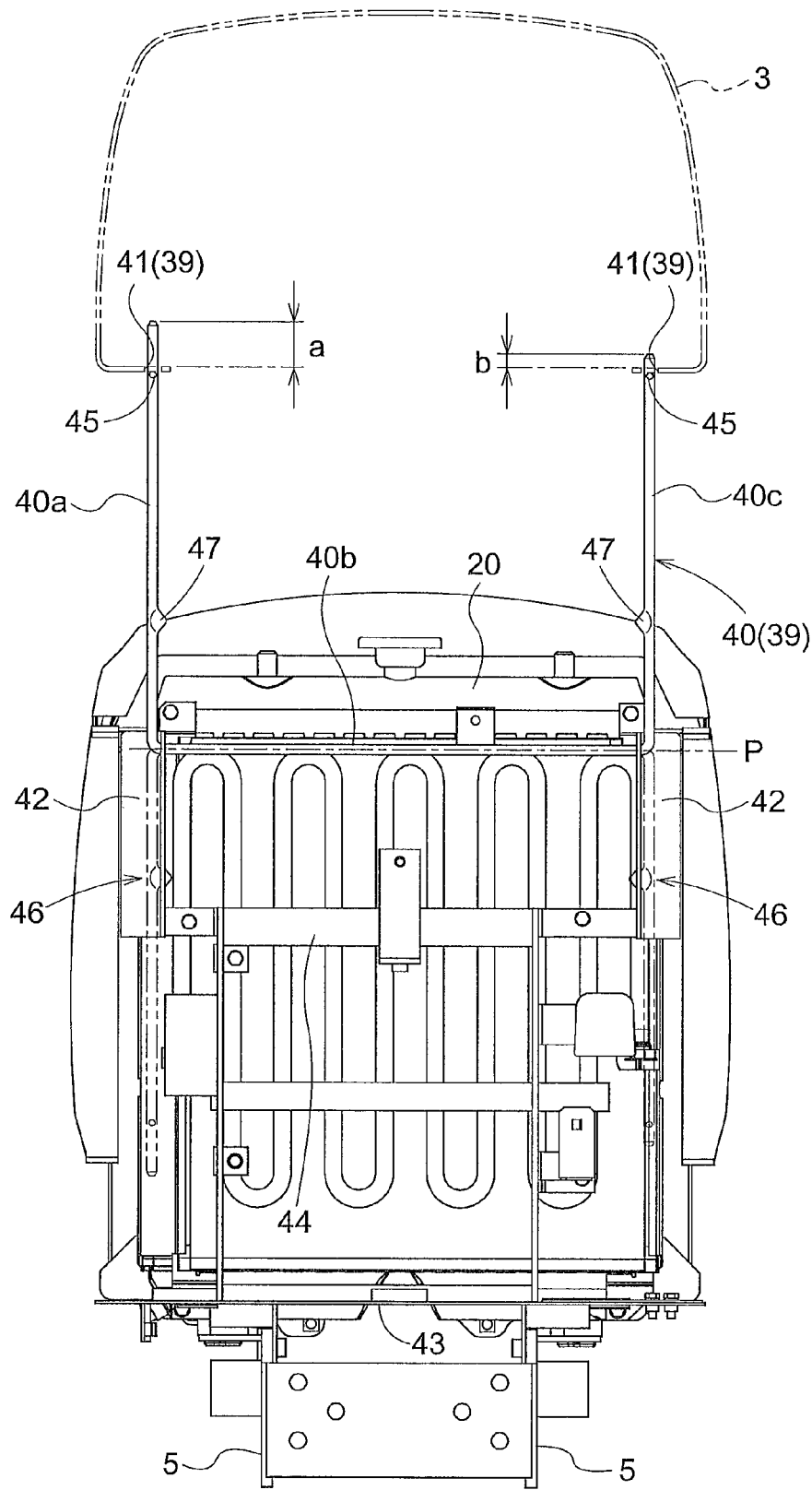
FIG. 7 is a section view showing a position maintaining mechanism as seen in the vehicle body fore/aft direction.

Further, as shown in FIG. 2 and FIG. 7, there is provided a position maintaining mechanism 39 for maintaining the movable hood portion 3A at the opened state after the movable hood portion 3A is upwardly pivoted to the opened state. This position maintaining mechanism 39 will be described with reference to FIGS. 7 and 8. The position maintaining mechanism 39 is comprised of a pivot support 40 pivotably provided on the traveling vehicle body 4 side; and two inserting portions 41 provided in the movable hood portion 3A and capable of receiving the respective leading ends of the pivot support 40 inserted therein.

The pivot support 40 is comprised of a bar-like member bent into a form of angular hooked shape and includes a first portion 40a which extends vertically, a second portion 40b which extends in the vehicle body lateral width direction and a third portion 40c which extends vertically. The pivot support 40 is arranged with the second portion 40b extending through the upper ends of a pair of right and left support bases 42 spaced from each other in the vehicle body lateral width direction. With this, the pivot support 40 is supported by the pair of right and left support bases 42 to be pivotable with the upper ends of the support bases 42 acting as the pivot axis P. As shown in FIGS. 2-4, each of the pair of right and left support bases 42 is connected to a position maintaining member 44 for maintaining the position of the battery 19 mounted on a mount 43 and extends upward on the rear side of this position maintaining member 44. The inserting portion 41 is provided in association with the right/left lateral wall portion 302 on the right/left side, and configured such that, as the leading ends of the first portion 40a and the third portion 40c of the pivot support 40 are inserted to the inserting portions 41 on the right and left opposed sides, respectively, the movable hood portion 3A is maintained in position under the opened state. Each of the inserting portions 41 is provided in association with a portion of the right/left lateral wall portion 302 on the right/left side where the lower end thereof is bent inwards. And, the inserting portion 41 is comprised of a hole having a diameter capable of inserting the bar-like pivot support 40 or withdrawing the support 40 therefrom.

At the first portion 40a and the third portion 40c of the pivot support 40, there are provided projecting contact portions 45 that project radially outwards. When the pivot support 40 is to be inserted to the inserting portions 41, the projecting contact portions 45 come into contact with the right and left lateral wall portions 302, whereby further movements of the right and left lateral wall portions 302 and the pivot support 40 relative to each other in the inserting direction is restricted, so that the inserting positions of the first portion 40a and the third portion 40c relative to the inserting portions 41 are regulated. The pivot support 40 is configured such that the first portion 40a and the third portion 40c have lengths different from each other; and the positions of the projecting contact portions 45 are adjusted such that, when the pivot support 40 is inserted to the inserting portions 41, the movable hood portion 3A may be maintained under a horizontal posture. In the instant embodiment, the first portion 40a has a length different from that of the third portion 40c; and the positions of the projecting contact portions 45 are adjusted such that the insertion amount (a) of the first portion 40a to the inserting portion 41 is greater than the insertion amount (b) of the third portion 40c to the inserting portion 41.

When the movable hood portion 3A is to be maintained in position under the opened state after the movable hood portion 3A will be lifted up to be pivoted upwards and the pivot support 40 too will be pivoted upwards, firstly, the leading end of the first portion 40a of the pivot support 40 will be inserted to the corresponding inserting portion 41. Subsequently thereto, the leading end of the third portion 40c of the pivot support 40 will be inserted to the corresponding inserting portion 41. In this way, it is not necessary to insert the first portion 40a and the third portion 40c to the inserting portions 41 at one time. Thus, the worker's operation is simplified; yet, the movable hood portion 3A can be maintained in position under the opened state appropriately.

Further, when the movable hood portion 3A under the opened state is to be brought into the closed state, firstly, the movable hood portion 3A will be pivoted upwards slightly to remove the pivot support 40 from the inserting portions 41 and then this pivot support 40 will be pivoted downwards. In this context, when the pivot support 40 is pivoted downwards, there is provided an engaging mechanism 46 in order to maintain this pivot support 40 in position. This engaging mechanism 46, as shown in FIG. 8, includes projections 47 provided respectively in the first portion 40a and the third portion 40c of the pivot support 40, and recesses 48 provided in the support bases 42. In operation of this engaging mechanism 46, as the projections 47 are engaged in the respective recesses 48, the pivot support 40 is maintained in position.

Other Embodiments (1) In the foregoing embodiment, regarding the positional relationship between the division member 27 and the opening 32, the lower end of the opening 32 is located at the substantially same position as the division member 27 in the vertical direction. Instead of this, an alternative arrangement is possible wherein an intermediate portion of the opening 32 in the vertical direction is located at a substantially same position as the division member 27.

Further, regarding the width of the opening 32 in the vehicle body fore/aft direction too, this width need not be greater than the width of the division member 27, but may be substantially same as the width of the division member 27.

(2) In the foregoing embodiment, the exhaust treatment apparatus 23 is attached to and supported on the upper side of the division member 27. Instead of this, the exhaust treatment apparatus may be supported by a support separate from the division member in such a manner that this exhaust treatment apparatus may be disposed above the division member.

(3) In the foregoing embodiment, a tractor was described as an example of the work vehicle. However, the present invention may be applied to various other kinds of work vehicles also.

What is claimed is:

1. A work vehicle comprising:
    a hood for covering an engine room;
    a cooling fan mounted in the engine room;
    a board-like division member that extends in a vehicle body transverse direction so as to divide a portion of the engine room into an upper region and a lower region in an engine room height direction;
    an engine mounted downwardly of the division member;
    an exhaust treatment apparatus mounted upwardly of the division member for treating exhaust gas from the engine; and
    an air discharge portion formed in a lateral face region of the hood which corresponds to a position of the division member in the engine room height direction, air inside the engine room being discharged to the outside through the air discharge portion; and
    a partitioning wall member for dividing the engine room into a first sectioned chamber and a second sectioned chamber in a vehicle body fore/aft direction;
    wherein the second sectioned chamber accommodates the cooling fan, the engine and the exhaust purifying device; and
    the air discharge portion discharges air inside the second sectioned chamber to the outside.

2. A work vehicle according to claim 1, wherein the exhaust purifying apparatus is attached to the division member.

3. A work vehicle according to claim 1, wherein
    the hood includes: a movable hood portion that can be opened/closed between a closed state for covering the engine room and an opened state for opening up the engine room; and a fixed hood portion that is fixed to the vehicle body; and
    the air discharge portion is formed in the movable hood portion.

4. A work vehicle according to claim 3, wherein the air discharge portion is an opening formed in the movable hood portion.

5. A work vehicle according to claim 3, wherein
    the fixed hood portion is a cover member made of resin that extends in a fore/aft direction of the vehicle body so as to cover lower portions of respective lateral sides of the engine room; and
    the movable hood portion has right and left side wall portions that extend in the fore/aft direction of the vehicle body so as to cover upper portions of the lateral sides of the engine room.

6. A work vehicle according to claim 1, wherein the second sectioned chamber is disposed forwardly of the first sectioned chamber relative to the vehicle body fore/aft direction.

7. A work vehicle according to claim 4, wherein
    a position of a lower edge of the opening in the vehicle body fore/aft direction is in substantial agreement with a position of the division member relative to the engine room height direction; and
    a length of the opening relative to the vehicle body fore/aft direction is greater than a length of the division member relative to the vehicle body fore/aft direction.

8. A work vehicle according to claim 1, further comprising:
    a second air discharge portion formed in the lateral face region of the hood downwardly of the air discharge portion for discharging the air present in the lower region to the outside.

9. A work vehicle comprising:
    a hood for covering an engine room;
    a cooling fan mounted in the engine room;
    a board-like division member that extends in a vehicle body transverse direction so as to divide a portion of the engine room into an upper region and a lower region in an engine room height direction;
    an engine mounted downwardly of the division member;
    an exhaust treatment apparatus mounted upwardly of the division member for treating exhaust gas from the engine; and
    an air discharge portion formed in a lateral face region of the hood which corresponds to a position of the division member in the engine room height direction, air inside the engine room being discharged to the outside through the air discharge portion;
    wherein the hood includes: a movable hood portion that can be opened/closed between a closed state for covering the engine room and an opened state for opening up the engine room; and a fixed hood portion that is fixed to the vehicle body; and
    the air discharge portion is an opening formed in the movable hood portion.

10. A work vehicle according to claim 9, wherein the exhaust purifying apparatus is attached to the division member.

11. A work vehicle according to claim 9, wherein
    the fixed hood portion is a cover member made of resin that extends in a fore/aft direction of the vehicle body so as to cover lower portions of respective lateral sides of the engine room; and
    the movable hood portion has right and left side wall portions that extend in the fore/aft direction of the vehicle body so as to cover upper portions of the lateral sides of the engine room.

12. A work vehicle according to claim 9, further comprising:
    a partitioning wall member for dividing the engine room into a first sectioned chamber and a second sectioned chamber in a vehicle body fore/aft direction;
    wherein the second sectioned chamber accommodates the cooling fan, the engine and the exhaust purifying device; and
    the air discharge portion discharges air inside the second sectioned chamber to the outside; and
    wherein the second sectioned chamber is disposed forwardly of the first sectioned chamber relative to the vehicle body fore/aft direction.

13. A work vehicle according to claim 9, wherein
    a position of a lower edge of the opening in the vehicle body fore/aft direction is in substantial agreement with a position of the division member relative to the engine room height direction; and a length of the opening relative to the vehicle body fore/aft direction is greater than a length of the division member relative to the vehicle body fore/aft direction.

14. A work vehicle according to claim 9, further comprising:
a second air discharge portion formed in the lateral face region of the hood downwardly of the air discharge portion for discharging the air present in the lower region to the outside.

15. A work vehicle comprising:
a hood for covering an engine room;
a cooling fan mounted in the engine room;
a board-like division member that extends in a vehicle body transverse direction so as to divide a portion of the engine room into an upper region and a lower region in an engine room height direction;
an engine mounted downwardly of the division member;
an exhaust treatment apparatus mounted upwardly of the division member for treating exhaust gas from the engine; and
an air discharge portion formed in a lateral face region of the hood which corresponds to a position of the division member in the engine room height direction, air inside the engine room being discharged to the outside through the air discharge portion;
wherein the hood includes: a movable hood portion that can be opened/closed between a closed state for covering the engine room and an opened state for opening up the engine room; and
a fixed hood portion that is fixed to the vehicle body; and
the air discharge portion is formed in the movable hood portion; and
wherein the fixed hood portion is a cover member made of resin that extends in a fore/aft direction of the vehicle body so as to cover lower portions of respective lateral sides of the engine room; and
the movable hood portion has right and left side wall portions that extend in the fore/aft direction of the vehicle body so as to cover upper portions of the lateral sides of the engine room.

16. A work vehicle according to claim 15, wherein the exhaust purifying apparatus is attached to the division member.

17. A work vehicle according to claim 15, further comprising:
a partitioning wall member for dividing the engine room into a first sectioned chamber and a second sectioned chamber in a vehicle body fore/aft direction;
the second sectioned chamber accommodating the cooling fan, the engine and the exhaust purifying device; and
the air discharge portion discharging air inside the second sectioned chamber to the outside; and
wherein the second sectioned chamber is disposed forwardly of the first sectioned chamber relative to the vehicle body fore/aft direction.

18. A work vehicle according to claim 15,
wherein the air discharge portion is an opening formed in the movable hood portion; and
wherein a position of a lower edge of the opening in the vehicle body fore/aft direction is in substantial agreement with a position of the division member relative to the engine room height direction; and
a length of the opening relative to the vehicle body fore/aft direction is greater than a length of the division member relative to the vehicle body fore/aft direction.

19. A work vehicle according to claim 15, further comprising:
a second air discharge portion formed in the lateral face region of the hood downwardly of the air discharge portion for discharging the air present in the lower region to the outside.

* * * * *